March 10, 1959  G. VANCE ET AL  2,877,286
RADIANT ENERGY SHIELDING DEVICE
Filed June 13, 1955
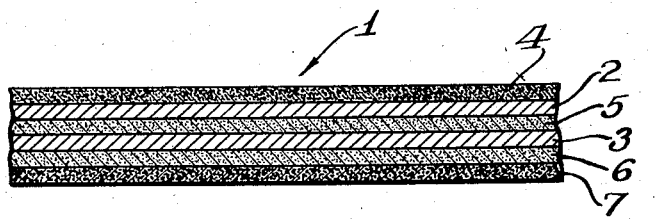
Inventors:
Glenn Vance
Glenn L. Powers
Paul W. Stokesberry
Myron H. Colman
Donald L. Klipstein
By Gary, Desmond & Parker
Attys.

United States Patent Office 2,877,286
Patented Mar. 10, 1959

2,877,286

RADIANT ENERGY SHIELDING DEVICE

Glenn Vance, Des Plaines, and Glenn L. Powers, Paul W. Stokesberry, Myron H. Colman, and Donald L. Klipstein, Chicago, Ill., assignors to CS-13 Corporation, Chicago, Ill., a corporation of Illinois Application June 13, 1955, Serial No. 514,954

8 Claims. (Cl. 174—35)

This invention relates to improvements in a shield for electrical or electronic devices and refers particularly to a shield which is effective in protecting electrical or electronic devices from the effects of magnetic fields of constant direction, electrostatic fields and electric and magnetic fields set up by the flow of alternating currents.

Shields for electrical and electronic devices have heretofore been proposed but such shields are ineffective, expensive and cumbersome. Some shields heretofore proposed offer a degree of shielding against certain types of energy disturbances but are almost wholly ineffective against other types of disturbances. For instance, some shields offer a degree of shielding against unidirectional magnetic fields, such as the earth's magnetic field, but are ineffective against magnetic and electric fields set up by alternating current flow. Others may have a shielding effect against disturbances set up by alternating current flow but are ineffective against unidirection magnetic fields of appreciable strength or against electrostatic fields. All shields heretofore proposed are expensive and cumbersome.

The present invention comprises a shield which is effective against substantially any type of electrical or magnetic disturbances and is of such character that it can be conveniently applied to substantially any type of electrical or electronic device substantially regardless of its size or shape.

The shield comprising the present invention is also of such character that it adds a minimum of weight or bulk to the device being shielded; can be conveniently and efficiently applied to the device, and adds a minimum of expense to the shielded device.

Other objects and advantages of the present invention will be apparent from the accompanying drawing and following detailed description.

The single figure of the drawing illustrates a sectional view of our improved shield in greatly exaggerated dimensions.

Referring in detail to the drawing, 1 indicates generally a section of a shield embodying the concepts of the present invention. The shield 1 comprises two spaced metallic plates 2 and 3 together with composition coating layers 4, 5, 6 and 7. The shield 1 may be of any size and may be shaped to conform with the shape of the device which it is intended to shield.

Plate 2 is a nickel alloy which may include nickel, aluminum, copper, chromium, iron and manganese. This alloy is conductive of electricity and, hence, contributes to the shielding of electric or electrostatic fields. The plate is also paramagnetic and has excellent shielding properties against magnetic forces. In addition, said plate is especially effective in shielding energy disturbances set up by alternating current flow. The preferred composition of the alloy comprising plate 2 is as follows:

| | Parts by weight |
|---|---|
| Nickel | 45–77 |
| Aluminum | 0.5–1.0 |
| Copper | 6.0–8.0 |
| Chromium | 1.0–2.0 |
| Iron | 14.0–16.0 |
| Manganese | 0.5–1.0 |

The plate 2, in general, may comprise any nickel alloy which has strong magnetic properties.

On one face of the plate 2 an electrically conductive layer 4 is positioned, said layer containing a diamagnetic powdered metal and being substantially non-permeable to magnetic forces. The layer 4 is effective in shielding against electric or electrostatic fields and assists the plate 2 in offering shielding against this type of energy disturbance. The shielding effect produced by the plate 2 with layer 4 in contact therewith is greater than the additive effect of the plate 2 and layer 4 used alone because of particle saturation within layer 4 when current passes through plate 2. This saturation is produced when the plate 2 and layer 4 are in contact which augments their normal shielding action. However, the reason for the phenomena is unknown and it is not intended that the hypothesis stated hereinbefore is to be accepted as the explanation of the phenomena.

The composition of the layer 4 may comprise copper powder or other diamagnetic metal powder in the neighborhood of 100 mesh, 10–15 parts by weight, a binder 45–50 parts by weight, a solvent for the binder 10–15 parts, a filler, 20 to 25 parts and a small amount of drier. The binder is preferably a resinous binder which is not hydrophilic, such as, a silicone resin and the solvent employed may be one miscible with the binder, for instance, xylene or the like. The filler is preferably of a siliceous nature, such as, mica, kaolin, powdered silica or the like, or all three binders may be employed; mica as a leafing agent, kaolin as an amorphous material and silica as a crystalline material. If all three are employed as fillers, the mica is incorporated in powdered form in the neighborhood of 325 mesh and in the proportion of about 10 to 15 parts by weight. The kaolin and the silica may also be in powdered condition and may be in substantially equal proportions of about 5 to 10 parts by weight. A drier, such as, calcium sulfate or the like may be incorporated in proportions of preferably less than 1.0 part by weight.

A preferred composition of layer 4 may be as follows:

| | Parts by weight |
|---|---|
| Silicone resin | 45 |
| Xylene | 15 |
| Copper powder (100 mesh) | 15 |
| Mica powder (325 mesh) | 14 |
| Kaolin powder | 5 |
| Silica powder | 5 |
| Calcium sulfate | 1 |

The layer 4 may be applied to the face of plate 2 by dipping, painting or the like, but it is preferred that the material comprising layer 4 be applied by a conventional flock gun.

To the opposite face of the plate 2 a layer 5 is applied, said layer comprising essentially iron filings or iron powder, a binder, graphite or carbon powder and a leafing agent, such as, mica, in powdered form. The iron filings or iron powder may comprise about 70 to 75 parts by weight of the layer and may be of a particle size of about 40 to 60 mesh. Any suitable type of binder may be employed, such as, silicone resin, lacquer, shellac or the like and may comprise about 20 to 30 parts by weight of the layer. The graphite or carbon powder may comprise 1 to 2 parts by weight of the layer and the leafing agent may be employed in substantially the same proportions as the graphite.

A preferred composition of layer 5 may be as follows:

| | Parts by weight |
|---|---|
| Powdered iron (40 mesh) | 75 |
| Powdered graphite | 2 |
| Powdered mica | 2 |
| Silicone resin | 21 |

The layer 5 is particularly effective as a magnetic shield. Here again, as in the relationship of layer 4 to plate 2, it has been found that the effective shielding efficiency of the juxtaposed layers 2 and 5 with respect to magnetic fields is greater than the additive effect of plate 2 and layer 5 considered individually.

The second plate 3 is preferably constructed of silicon steel containing a range of 2 to 3 percent silicon and with a low carbon content. However, plate 3 may comprise soft iron, a ferrite compound, a ferride compound or other metallic material having inherently high magnetic permeability and low magnetic retentivity. If only alternating fields are to be shielded, plate 3 may comprise a nickel alloy similar to plate 2.

The layer 6 is similar to layer 5 and is disposed on the opposite face of the plate 3. Plate 3 is particularly effective in shielding against magnetic fields and taken together with layers 5 and 6 contribute materially to the effectiveness of the shield as a shield against magnetic fields. Again the effectiveness of the assembly comprising plate 3 and layers 5 and 6 as a shield against magnetic forces is greater than the additive effect of the plate and layers considered individually. In addition, both layers 5 and 6 and plate 3 are conductive to electricity, and, hence, both of said layers and said plate contribute to the effectiveness of the shield 1 as a shield against electric or electrostatic fields.

An electrically conductive layer 7, similar in composition to layer 4, may be applied to the outer face of layer 6 thus adding shielding against electric and electrostatic fields.

The various layers 4, 5, 6 and 7 may be painted upon the plates 2 and 3 and upon each other or, as preferred, said layers may be applied by a conventional flock gun. The layers 4, 5, 6 and 7 may be as thin as .006 inch and still be effective or, if desired, said layers may be made as thick as desired.

The shield 1 is preferably disposed upon the device being shielded with the layer 4 innermost, that is, toward the device shielded. However, the positioning of the shield may be reversed, if desired, it functioning as an effective shield in either position.

The shield 1 may be disposed upon such electrical or electronic devices that may be detrimentally effected by stray electric or magnetic fields, such as, television picture tubes, or cathode ray tubes generally, camera tubes, Geiger-Muller tubes or the like, or the shield may be placed upon devices which give off undesirable electric, electrostatic or magnetic energy, such as, transformers, X-ray devices or the like.

We claim as our invention:

1. A shield for obstructing the passage of electric and magnetic radiant energy which comprises, a metallic plate constructed of a paramagnetic nickel alloy, a spaced silicon steel plate, a composition layer comprising an electrically conductive ferro-magnetic material in finely divided form and a binder interposed between the two plates, a similar composition layer disposed on the opposite side of said steel plate, and composition layers comprising an electrically conductive diamagnetic material in finely divided form and a binder disposed respectively upon said alloy plate and said last-mentioned layer containing the ferro-magnetic material.

2. A shield for obstructing the passage of electric and magnetic radiant energy which comprises, a metallic plate constructed of a paramagnetic nickel alloy having the following composition, nickel, aluminum, copper, chromium, iron and manganese, a spaced silicon steel plate, a composition layer comprising an electrically conductive ferro-magnetic material in finely divided form and a binder interposed between the two plates, a similar composition layer disposed on the opposite side of said steel plate, and composition layers comprising an electrically conductive diamagnetic material in finely divided form and a binder disposed respectively upon said alloy plate and said last-mentioned layer containing the ferro-magnetic material.

3. A shield for obstructing the passage of electric and magnetic radiant energy which comprises, a metallic plate constructed of a paramagnetic nickel alloy, a spaced silicon steel plate, a composition layer comprising powdered iron and a binder interposed between the two plates, a similar composition layer disposed on the opposite side of said steel plate, and composition layers comprising an electrically conductive diamagnetic material in finely divided form and a binder disposed respectively upon said alloy plate and said last-mentioned layer containing the ferro-magnetic material.

4. A shield for obstructing the passage of electric and magnetic radiant energy which comprises, a metallic plate constructed of a paramagnetic nickel alloy, a spaced silicon steel plate, a composition layer comprising a ferro-magnetic material in finely divided form and a binder interposed between the two plates, a similar composition layer disposed on the opposite side of said steel plate, and composition layers comprising powdered copper and a binder disposed respectively upon said alloy plate and said last-mentioned layer containing the ferro-magnetic material.

5. A shield for obstructing the passage of electric and magnetic radiant energy which comprises, a metallic plate constructed of a paramagnetic nickel alloy, a spaced silicon steel plate, a composition layer comprising powdered iron of about 40 to 60 mesh and a binder interposed between the two plates, a similar composition layer disposed on the opposite side of said steel plate, and composition layers comprising a diamagnetic material in finely divided form and a binder disposed respectively upon said alloy plate and said last-mentioned layer containing the ferro-magnetic material.

6. A shield for obstructing the passage of electric and magnetic radiant energy which comprises, a metallic plate constructed of a paramagnetic nickel alloy, a spaced silicon steel plate, a composition layer comprising a ferro-magnetic material in finely divided form and a binder interposed between the two plates, a similar composition layer disposed on the opposite side of said steel plate, and composition layers comprising powdered diamagnetic metal of about 100 mesh and a binder disposed respectively upon said alloy plate and said last-mentioned layer containing the ferro-magnetic material.

7. A shield for obstructing the passage of electric and magnetic radiant energy which comprises, a metallic plate constructed of a paramagnetic nickel alloy having the following composition, nickel, aluminum, copper, chromium, iron and manganese, a spaced silicon steel plate, a composition layer comprising powdered iron and a binder interposed between the two plates, a similar composition layer disposed on the opposite side of said steel plate, and composition layers comprising powdered copper and a binder disposed respectively upon said alloy plate and said last-mentioned layer containing the ferro-magnetic material.

8. A shield for obstructing the passage of electric and magnetic radiant energy and which is particularly effective in obstructing magnetic radiant energy of the alternating type which comprises, a metallic plate constructed of a paramagnetic nickel alloy, a spaced metallic plate of substantially similar composition to said first-mentioned plate, a composition layer comprising a ferro-magnetic material in finely divided form and a binder interposed between the two plates, a similar composition layer disposed on the opposite side of said second-mentioned plate, and composition layers comprising a diamagnetic material in finely divided form and a binder disposed respectively upon the opposite side of said first-mentioned plate and on the opposite side of said last-mentioned layer containing the ferro-magnetic material.

References Cited in the file of this patent

UNITED STATES PATENTS

| | | |
|---|---|---|
| 1,854,942 | Lapof | Apr. 19, 1932 |
| 2,405,987 | Arnold | Aug. 20, 1946 |
| 2,424,788 | Bachman et al. | July 29, 1947 |
| 2,671,817 | Groddeck | Mar. 9, 1954 |

FOREIGN PATENTS

| | | |
|---|---|---|
| 884,659 | Germany | July 27, 1953 |